(12) United States Patent
Yerli (10) Patent No.: US 9,185,213 B2
(45) Date of Patent: Nov. 10, 2015

(54) ADVANCED CALLING

(71) Applicant: Gface GmbH, Frankfurt am Main (DE)

(72) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 0 days.

(21) Appl. No.: 13/660,981

(22) Filed: Oct. 25, 2012

(65) Prior Publication Data

US 2014/0119526 A1    May 1, 2014

(51) Int. Cl.
*H04M 3/42* (2006.01)
*H04M 3/436* (2006.01)

(52) U.S. Cl.
CPC .................................. *H04M 3/4365* (2013.01)

(58) Field of Classification Search
CPC .. H04M 1/57; H04M 3/42034; H04M 3/4365
USPC ............... 379/201.01, 207.02, 142.01, 88.11, 379/88.19, 88.21
See application file for complete search history.

(56) References Cited

U.S. PATENT DOCUMENTS

| 6,009,093 | A | 12/1999 | Choe |
| 6,977,993 | B2* | 12/2005 | Starbuck et al. ........... 379/88.21 |
| 7,623,643 | B2* | 11/2009 | Raghav et al. ........... 379/201.01 |
| 7,693,553 | B2 | 4/2010 | Moody et al. ................. 455/567 |
| 7,720,213 | B2* | 5/2010 | Desai et al. .............. 379/207.16 |
| 7,822,188 | B1 | 10/2010 | Kirchhoff |
| 8,102,986 | B1* | 1/2012 | McClintock et al. .... 379/210.01 |
| 2002/0012425 | A1* | 1/2002 | Brisebois et al. ........ 379/142.01 |
| 2003/0215078 | A1 | 11/2003 | Brahm |
| 2004/0234062 | A1* | 11/2004 | Jones ........................ 379/210.02 |
| 2006/0094407 | A1* | 5/2006 | Karaoguz et al. .......... 455/414.1 |
| 2006/0147002 | A1* | 7/2006 | Desai et al. ............... 379/100.06 |
| 2007/0135127 | A1* | 6/2007 | Andersson ..................... 455/445 |
| 2008/0020777 | A1* | 1/2008 | Zhang et al. ................... 455/445 |
| 2009/0019061 | A1 | 1/2009 | Scannell, Jr. |
| 2009/0310766 | A1 | 12/2009 | Ye |
| 2010/0158220 | A1 | 6/2010 | Silverman |
| 2011/0129077 | A1* | 6/2011 | Prakash et al. ........... 379/142.04 |
| 2012/0033610 | A1* | 2/2012 | Ring et al. ..................... 370/328 |

FOREIGN PATENT DOCUMENTS

KR    1020070029488 A    3/2007

OTHER PUBLICATIONS

European Search Report dated Nov. 14, 2013, in European Application No. 13186164.3, filed Sep. 26, 2013, 6 pages.
Notice of Grounds for Refusal from the Korean Intellectual Property Office mailed Feb. 9, 2015, issued in corresponding Korean Application No. 1020130125942, filed Oct. 22, 2013, 14 pages.

\* cited by examiner

*Primary Examiner* — Sonia Gay
(74) *Attorney, Agent, or Firm* — Christensen O'Connor Johnson Kindness PLLC (57) ABSTRACT

Systems, devices, and methods are described that allow more comprehensive interaction between users of a telecommunication system. For example, a described method comprises: receiving, from a first communication unit, a request to establish a voice communication call between a first user of the first communication unit and a second user of a second communication unit; receiving, from said first communication unit, additional information with regard to said request; and presenting, by said second communication unit, an indication of said request to establish said voice communication call and said additional information to said second user.

17 Claims, 5 Drawing Sheets

ADVANCED CALLING

FIELD

This disclosure provides a method, a telecommunication system, and a communication unit for providing advanced calling capabilities.

BACKGROUND

In known telecommunication systems, the recipient of a telephone call may be provided with an identity of the caller. The identity of the caller may be displayed, e.g., in the form of a name, a phone number, or some other information that was previously stored along with the caller's name or phone number. Being informed about the caller's identity, the recipient may then decide whether he wishes to answer the call. The recipient may be informed about calls that the recipient missed in the past, along with the identities of the callers.

However, in the known telecommunication systems, the recipient of a call may only decide whether to answer the call or whether to call back based on the identity of the caller. Yet, even if the caller and the recipient do not know each other well, the call may still be of high importance. The known systems do not provide a possibility for the caller to express the importance of his call to the recipient in case the recipient does not answer the call.

There is thus a need for advanced calling capabilities such that the users of a telecommunication system may interact more comprehensively with each other.

SUMMARY

The disclosure allows a more comprehensive interaction between users of a telecommunication system. In particular, the disclosure allows a caller to personalize a call by adding additional information, like, for example, an interactive calling card to the calls. The calling card can be added to calls made to an individual or to any number of selected users or a predetermined group of users of the telecommunication system. The telecommunication system may comprise, for example, a social network or be incorporated in a social network.

In a first aspect, the disclosure provides a method comprising: receiving from a first communication unit a request to establish a voice communication call between a first user of the first communication unit and a second user of a second communication unit; receiving, from said first communication unit, additional information with regard to said request; and presenting, by said second communication unit, an indication of said request to establish said voice communication call and said additional information to said second user.

This method allows the first communication unit to attach additional information to the request to establish a voice communication call with the second user of the second communication unit. The first communication unit may, e.g., have previously received said additional information from the first user, in particular, using an input device of the first communication unit as described below. The second communication unit receives the additional information and presents the additional information to the second user of the second communication unit. The second user receiving the request is thus provided with the additional information and may thus decide on whether to answer that call or, in case the second user has missed the call, whether to call back the first user. The first communication unit may be adapted to place said request in response to an input by the first user. E.g., the first user may enter a phone number of the second communication unit, or a user name or e-mail address of the second user and, in response to that, the first communication unit requests to establish the voice communication call. In some embodiments, the first user may place the request by selecting an icon, a user name or any other identification of the second user or the second communication unit using an input device of the first communication unit. Additionally or alternatively, the first user may enter a user name, telephone number or any other identification of the second user or the second communication unit using an input device of the first communication unit. The additional information may be received from the user by the first communication unit or may be attached automatically from the first communication unit as explained below in more detail. In some instances, a first portion of the additional information is received from the first user and a second portion is automatically added by the first communication unit. While portions of the following description may describe the additional information to be entered by the first user, it is to be understood that a portion or all of the additional information may automatically be added by the first communication unit.

The first and second communication units may be used by the first and second user, respectively, to interact via a telecommunication system. As such, the first and second communication units may be part of the telecommunication system.

The first communication unit and/or the second communication unit may comprise a computer, in particular, a PC, a laptop, a PDA, etc., or a telephone such as a mobile phone, in particular, a smartphone. In some embodiments, the first and the second communication unit may comprise similar or identical communication capabilities.

The second communication unit may comprise output means for presenting the indication of the first user's request and said additional information. In particular, the second communication unit may comprise different output means for presenting the indication of the first user's request and to present said additional information. The output means for presenting the indication may, in particular, comprise an audio output such as a loudspeaker. In some embodiments, the additional information is presented on a display of the second communication unit. In some embodiments, the indication of the request and the additional information are presented simultaneously.

In some instances, the request comprises identity information to identify the second communication unit and/or the second user, such as a phone number, e-mail address, user name, etc. Such identify information may be included in order to facilitate establishing the voice communication call. The additional information may comprise other data that are transmitted along with the request as will be discussed in more detail below. In some embodiments, the additional information therefore does not comprise a phone number, an e-mail address, a user name or any other information to identify the second communication unit and/or the second user within a telecommunication system, as such information required to establish the call will already be included in the request.

In some embodiments, the indication of the first user's request and the additional information are presented via the same output means of the second communication unit. In particular, a ringing tone of the second communication unit may by altered based on the additional information received from the first communication unit. Alternatively or additionally, an indication of the first user's request may be shown on a display provided on the second communication unit, along with said additional information.

In an embodiment, the method further comprises: presenting, by said first communication unit, a plurality of annotations to said first user; and receiving, by said first communication unit, a selection of at least one of said plurality annotations as said additional information from said first user. In this embodiment, the first user may select one or more predefined annotations as the additional information that is to be transmitted to the second communication unit. The plurality of annotations may be provided to the first user, e.g., as a list of annotations. In some embodiments, the plurality of annotations may be provided to the first user as a hierarchy of annotations, for example, in the form of a tree. This way, the first user may easily select the additional information without being required to enter a longer text into the first communication unit. The annotations may be predefined. In some embodiments, at least some of the annotations are editable or definable by the first user. According to an embodiment, said additional information comprises information as to whether said first user requests a call back from said second user. The first user may thus inform the second user of whether he wishes the second user to call him back.

In an embodiment, said additional information comprises information referring to a priority level attributed to said voice communication call by said first user of said first communication unit. In this embodiment, the first user may express the level of importance that he attributes to the call. In particular, the first user may label the call as being of "high importance," "importance," or "low importance."

According to an embodiment, said additional information comprises information as to whether said voice communication call is an emergency call. This way, the first user may inform the second user that, for example, an accident has happened. The second user may thus decide to call back the first user, when the second user has missed the call.

In an embodiment, said additional information comprises a note from said first user. In particular, the first user may attach a text message to his request to establish the voice communication. For example, the first user may enter a text message such as "have to cancel our appointment, let's rearrange" and add it to the request to establish a voice communication call. The second user receiving the call is thus informed that the appointment is canceled. The second user may then decide whether to answer the call to rearrange the appointment immediately or whether to call back at a later time.

According to an embodiment, said additional information comprises at least one of a text, an icon, a color, a letter and a number. This way, the additional information may be shown on a display of the second communication unit, such that the second user easily sees the additional information. In some embodiments, the additional information is presented to the second user by the second communication unit in the same way as it was received from the first user by the first communication unit. For example, when the first user entered a color into the first communication unit, the second communication unit will display the additional information using the same color. Additionally or alternatively, the second communication unit may convert the additional information into a different form than entered by the first user. For example, the second communication unit may present a different ringing tone depending on the color selected by the first user of the first communication unit.

According to an embodiment, said step of presenting further comprises presenting, by said second communication unit, supplementary information about at least said first user and/or said first communication unit to said second user. In this embodiment, the second user is also informed about the user or the communication unit that places the call. The supplementary information may, for example, comprise a relationship between the second user and the first user, such as "friend," "dad," "brother," etc. When used in a business network, the supplementary information may, for example, comprise "boss," "colleague," a business title, a department, etc., or any other information about the first user. The supplementary information may, for example, be stored in the second communication unit and/or may be stored at a server, through which the request to establish the call is forwarded from the first communication unit to the second communication unit. The supplementary information may thus generally comprise similar types of information as the additional information such as text, a color, a number, etc as specified elsewhere in this disclosure. Yet, the difference between the additional information and the supplementary information is that the former is received from the first communication unit, where it is entered by the first user or otherwise available, e.g., by being stored in a memory of the first communication unit, while the latter is stored in the second communication unit, i.e., in the communication unit of the person being called, or at a server as explained above. In some embodiments, the supplementary information is settable by said first user and/or said second user.

In an embodiment, said indication of said request to establish said voice communication call is presented to said second user responsive to a determination that said additional information complies with a set of one or more criteria. For example, the second communication unit may, in some embodiments, present the indication of the incoming call only when the first user has labeled his call to be an emergency call, a business call, a social call, a family call, a secret call, and/or otherwise matches a predefined call type. The call type may be included in the additional information received from the first user. Similarly, in some embodiments, the second communication unit may only present the indication to the second user when the additional information refers to a priority level above a threshold priority level. The priority level may, e.g., be specified as a number from 1 to n, as a color code, etc. In some embodiments, the second communication unit only presents said indication of the first user's request when said additional information and at least one of an identity of the first user, the first communication unit, and/or supplementary information about the first user and/or said first communication unit match set criteria.

The criteria are settable by said second user via said second communication unit. Hence, the second user may define the criteria, by which the second communication unit decides whether to present the indication of the incoming call to the second user. In some embodiments, the second user may set the criteria for each of a number of users, e.g., from the second user's phone book, separately. For example, the second user may set the criteria such that calls from his wife will only be presented to him when they are labeled as emergency calls, while calls from his boss will be presented by the second communication unit in all cases, or vice versa. In some embodiments, all incoming calls will be presented on a calling list of the second user, independent of the additional information matching the set criteria or not. Alternatively, only incoming requests with additional information matching the set criteria will be shown on a calling list by said second communication unit.

In some embodiments, the method further comprises receiving, by said second communication unit, an indication of at least one operation mode from said second user. In some embodiments, the method further comprises receiving, by said second communication unit, indications of different operation modes from said second user. The second user may specify an operation mode for one or more other users and/or other communication units. Additionally or alternatively, the second user may specify different operation modes for different additional information received from the caller, different calling users, and/or different communication units. One or more of the operation modes may refer to ignoring incoming call requests, sending a predefined message to the caller, diverting incoming calls to another user, another communication unit, and/or a voicemail, e-mail, etc. The predefined message may, in particular, be definable by said second user.

In some embodiments, the method may further comprise presenting, by said second communication unit, an indication of one or more missed and/or declined calls to the second user. The indication may comprise means like, e.g., a button allowing the second user to call back the caller.

According to an embodiment, said step of presenting further comprises presenting at least one of an identification of said first user and/or said first communication unit, a time when said request and/or said additional information was received at said second communication, a time when said request and/or said additional information was transmitted by said first communication unit, and a relationship between said second user and said first user. The second user is thus informed about further details of the call or the caller, respectively.

In a further aspect, the disclosure provides a telecommunication system comprising: first and second communication units; wherein said first communication unit is adapted to receive a request to establish a voice communication call with a second user of said second communication unit and additional information with regard to said voice communication call from a first user of said first communication unit a communication link coupled between said first and second communication units, wherein said first communication unit is adapted to transmit said request to establish a voice communication call and said additional information to said second communication unit via said communication link, wherein said second communication unit is adapted to present an indication of the first user's request to establish said voice communication call and said additional information to said second user.

In an embodiment, said communication link comprises different carriers for transmitting said voice communication and said additional information. Hence, the different carriers of the communication link may by optimized for forwarding voice communication or the additional information, respectively. In some embodiments, the request to establish the voice communication call and the additional information are transmitted via the same or via different carriers of the communication link. In some embodiments, the communication link comprises a same carrier for transmitting said voice communication and said additional information.

In some embodiments, the communication link is via a server. The server may, for example, add supplementary information to the first user's request as described above, e.g., based on the identity of the first user and/or the first communication unit. The supplementary information may, for example, be provided to the second user via the second communication unit. In some embodiments, the supplementary information added by the server may be shown on a display provided on the second communication unit.

In some embodiments, the additional information may be transmitted via a first server. In some embodiments, the voice information of the call and/or the request may be transmitted via a second server. In some embodiments, the first server may comprise a messenger server that is coupled to an advanced calling server. The advanced calling server may, e.g., store supplementary information associated with a user and/or a communication unit. When the additional information arrives at the messenger server, the messenger server may send identity information identifying the first user and/or the first communication unit to the advanced calling server. The advanced calling server uses the identity information to retrieve supplementary information which the advanced calling server then transmits back to the messenger server. The messenger server, in turn, forwards the supplementary information received from the advanced calling server along with the additional information to the second communication unit.

In some embodiments, the advanced calling server stores secondary identification information related to the second user. The secondary identification information may, e.g., comprise an e-mail address or a user name of the second user. The advanced calling server may, upon receiving the identity information from the messenger server, retrieve the secondary identification information related to the second user and forward it to the messenger server. The messenger server then sends the additional information to the second user using the secondary identification information. For example, the first user may specify the identity of the call's recipient by means of a phone number. The messenger server receives the second user's identity, e.g., the phone number, along with the additional information and forwards the phone number to the advanced calling server. The advanced calling server may retrieve an e-mail address associated with that phone number and send the retrieved e-mail address to the messenger server. The messenger server may then send the additional information received from the first user to the e-mail address received from the advanced calling server.

Additionally or alternatively, the advanced calling server may store a set of one or more criteria as specified above. The second user may set the one or more criteria via the second communication unit. The second communication unit may transmit the criteria set by the second user to the advanced calling server via the messenger server.

In an embodiment, said first communication unit comprises input means, said input means adapted to receive said additional information from said first user. In some embodiments, the identification of the second user or of the second communication unit is also received from the first user via the same input means of the first communication unit as the additional information.

According to an embodiment, said second communication unit comprises a display adapted to present said additional information to said second user. Alternatively or additionally, the second communication unit may comprise an audio output such as a loudspeaker for presenting said additional information to said second user.

In an embodiment, said second communication unit is adapted to present said indication of said request to establish said voice communication call and said additional information to said second user responsive to a determination that said additional information complies with a set of one or more criteria.

In a further aspect, the disclosure provides a first communication unit comprising: input means for receiving, from a first user of said first communication unit, a request to establish a voice communication call with a second user of a second communication unit and additional information with regard to said voice communication call; connection means for coupling to a communication link, wherein said connection means is adapted to transmit said request to establish the voice communication call and said additional information via said communication link.

According to an embodiment, said connection means is adapted to couple to first and second carriers of said communication link and is further adapted to transmit said request to establish the voice communication call via said first carrier of said communication link and to transmit said additional information via said second carrier of said communication link. In some embodiments, the voice communication is transmitted via the first carrier of the communication link, while the additional information is transmitted via the second carrier of the communication link. Alternatively, in some embodiments, the voice communication and the additional information is transmitted via a same carrier of the communication link.

In an embodiment, said additional information comprises at least one of a text, an icon, a color, or a letter and a number.

In a further aspect, the disclosure provides a communication unit which comprises a processor, a display device, a transceiver and a computer-readable storage medium. Said computer-readable storage medium has instructions stored thereon that are executable by said processor to cause said communication unit to receive a request to establish a voice communication call between said communication unit and a second communication unit, the request received by said transceiver from said second communication unit; receive additional information with regard to said request, said additional information received by said transceiver from said second communication unit; and present, by said display device, an indication of said request and said additional information.

According to an embodiment, said communication unit is adapted to receive said request via a first carrier and to receive said additional information via a second carrier.

In yet a further aspect, the disclosure provides a communication unit comprising a processor, an input device, a display device, a transceiver and a computer-readable storage medium. Said computer-readable storage medium has stored thereon instructions executable by said processor to cause said communication unit to present, by said display device, a user interface configured to allow a user to initiate a request to establish a voice communication call between said communication unit and a second communication unit; receive, by said input device, input configured to initiate said request to establish a voice communication call between said communication unit and said second communication unit; receive, by said input device, input corresponding to additional information relating to said voice communication call; and transmit, by said transceiver, said information corresponding to said request along with said additional information.

According to an embodiment, said communication unit is adapted to transmit said request via a first carrier and to transmit said additional information via a second carrier.

The skilled person will understand that features disclosed herein with regard to the method may, in some embodiments, also be present in the system or the communication unit of the disclosure and vice versa.

Further embodiments and benefits become evident from the following description in connection with the accompanying drawings.

DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
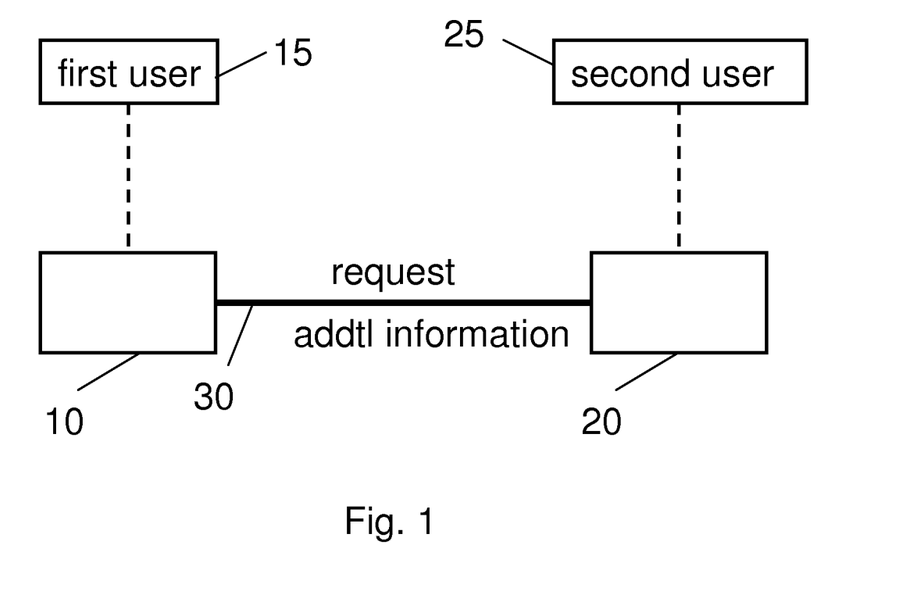
FIG. 1 is a schematic diagram of a telecommunication system according to the present disclosure.

FIG. 1 illustrates a telecommunication system according to the present disclosure. In other embodiments, the system may operate differently or include different components. A first communication unit 10 is coupled to a second communication unit 20 via a communication link 30. In the system of FIG. 1, the first communication unit 10 is associated with a first user 15, while the second communication unit 20 is associated with a second user 25. The first user 15, desiring to call the second user 25, initiates a request to call the second user 25 by interacting with the first communication unit 10. To this effect, the first communication unit 10 may comprise an input means like, for example, a keyboard, a touch screen, a microphone, etc. In the request to establish a voice communication call with the second communication unit 20 of second user 25, the first user 15 may specify a phone number, a user name, or any other identification of the second user 25 or the second communication unit 20. Information to be included in the request (e.g., a phone number) can be specified by the first user 15 for a particular request, and can be received in the first communication unit 10 via input from the first user. Alternatively or additionally, the first communication unit 10 can obtain information for the request from some other source, and/or automatically include information in the request. For example, in response to a user interaction with a "call" button (see, e.g., FIGS. 4 and 6) associated with the second user 25, the first communication unit 10 may obtain a phone number, user name, or other identification information from memory or persistent storage and include it in the request. In addition to the request to establish a voice communication call with the second user 25, the first communication unit 20 transmits additional information with regard to the call from the first user 15. The additional information may be received in the first communication unit via input from the first user 15. Alternatively, the additional first communication unit may automatically include additional information. For example, the first communication unit 10 may obtain group information or other information from memory or persistent storage and, in response to user interaction with a "call" button (see, e.g., FIGS. 4 and 6) associated with the second user 25, include it as additional information. As specified above, the additional information may refer to a priority, a note, an emergency indication, or any other sort of information that the first user 15 wants the second user 25 to have before answering the call or in case the second user 25 does not answer the call. The communication link 30 between the first communication unit 10 and the second communication unit 20 uses one carrier to transmit both the request to establish a voice communication call and the additional information. In case the second user 25 answers the call, any voice information related to the voice communication call is transmitted via the same carrier of communication link 30.

Figure 2:
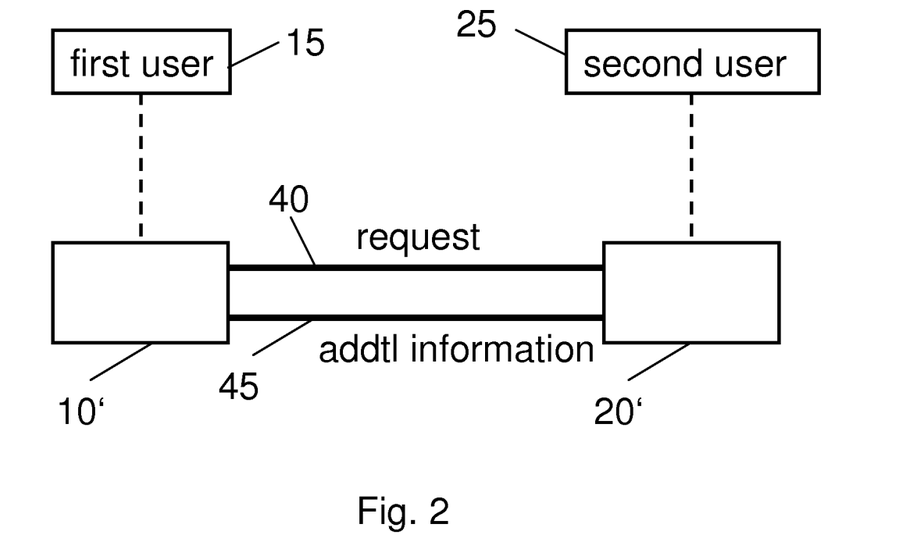
FIG. 2 is a schematic diagram of another telecommunication system according to the present disclosure.

FIG. 2 shows another embodiment of the communication system of the present disclosure. The system of FIG. 2 differs from that of FIG. 1 in that two different carriers 40, 45 of the communication link between the first communication unit 10' and the second communication unit 20' are used. A first carrier 40 of the communication link is used to transmit the request to establish a voice communication call from the first communication unit 10' to the second communication unit 20'. The same carrier 40 of the communication link is used to transmit the voice information between the first and second communication units 10', 20' during the call. A different carrier 45 of the communication link between the first and second communication units 10', 20' is used to transmit the additional information from the first communication unit 10' to the second communication unit 20'.

Figure 3:
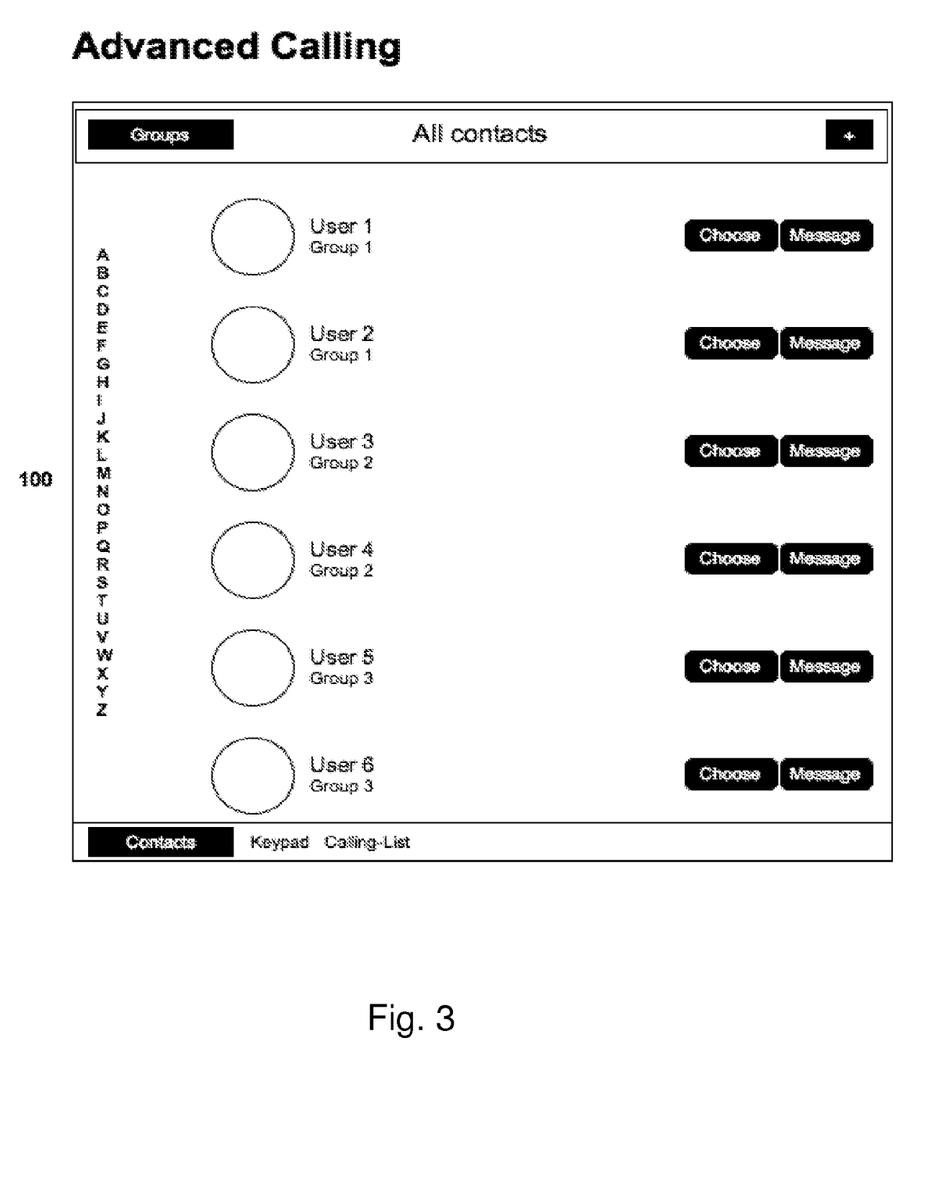
FIG. 3 is a screenshot of a user interface presented by the first communication unit to allow selection of a recipient for a call.

As set forth above, a caller can customize a call using the method, the system and the communication unit of the present disclosure. This allows the caller to engage in a more comprehensive interaction with recipients. As an example, FIG. 3 shows a screenshot of a user interface that is displayed to the first user when the first user (the caller) wants to establish a call. In the screenshot 100, a phone book of the first user is displayed, from which the first user may select individual recipients or groups. Alternatively or additionally, the first user may specify additional recipients not yet listed in the first user's phone book, e.g., by specifying an identity, a phone number, a user name, or anything else that may be used for identification of a recipient. The first user may also add recipients and groups to the first user's phone book. In order to specify individual recipients or groups, the first user may simply choose respective users from the phone book using buttons displayed in the calling card. Moreover, recipient details may be edited by the first user in the phone book. A phone book provides a quick and efficient way to find individuals or groups within the user's social network to send messages to or to place phone calls with.

Figure 4:
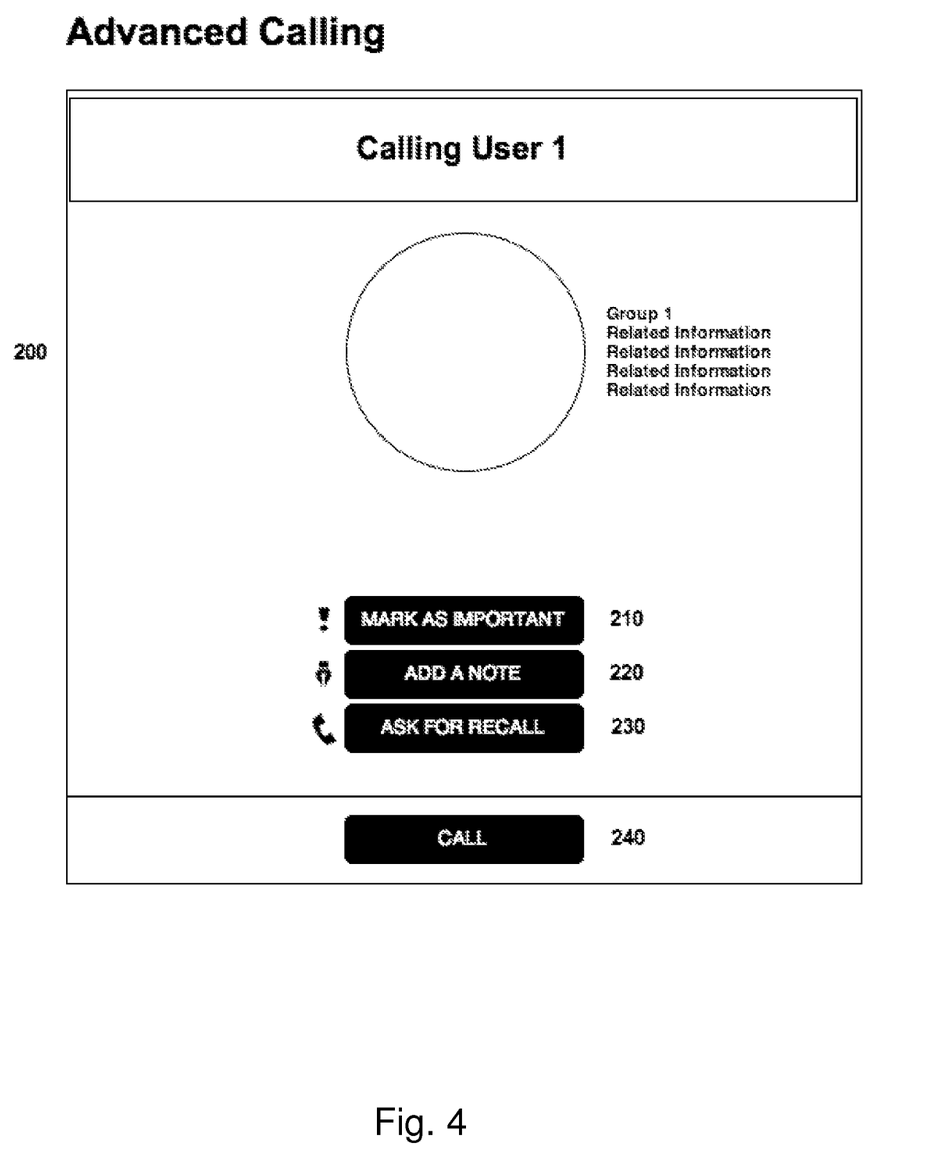
FIG. 4 is a screenshot of a user interface provided by the first communication unit to allow a first user to add additional information to a call.

FIG. 4 shows a screenshot 200 of a user interface comprising a calling card that may be presented to the first user when the first user has chosen to contact "user 1," e.g., using the phone book as shown in screenshot 100 of FIG. 1. The screenshot 200 provides the first user with predetermined options to better interact with the recipient and to add additional information to the first user's call as required.

In the top line of screenshot 200, the identity of the recipient (second user) chosen by the caller is shown. In this case, "User 1" is further identified as being a member of "Group 1." Other information related to User 1 may also be displayed in screenshot 200, such as a nickname, an indication of a relationship between the caller and User 1, etc. In addition, the related information may indicate whether User 1 is, e.g., a business associate or a family member of the caller.

As further options, the caller may click on button 210 labeled as "mark as important" in order to add a priority information to his request as a piece of additional information. Similarly, using button 220 labeled "add a note," the caller may add a note as a piece of additional information to his request. As a further option, the caller may click on button 230 labeled "ask for a recall" in order to transmit an information to User 1 that the caller wants User 1 to call back in case User 1 does not immediately answer the call.

When the caller has chosen his options e.g., using buttons 210, 220 and/or 230, the caller may click on button 240 labeled "call" in order to send the request and the additional information to the communication unit of user 1.

In addition or alternatively to the options illustrated in FIG. 4, the calling card presented to the first user intending to place a call with a second user may provide the first user the option to label a call with a degree of importance, e.g., by using a rating such as "highly important," "important" or "less important" and/or by adding a symbol or a color. In some embodiments, the first user may select an option to ask the second user for a recall which may also be provided with an importance rating such as "highly important," "important" or "less important," a symbol and/or a color. Alternatively or additionally, the first user may label his request to establish a call as an emergency, for example using a symbol or a color. In some embodiments, the user may add a note, which, for example, may be a text message embedded within the call, such as "have to cancel our appointment, let's reschedule." In some embodiments, the caller's communication unit may provide one or more predefined text messages to be sent as additional information. Alternatively or additionally, the caller may be enabled to freely input any text to be sent to the recipient's communication unit as additional information.

Figure 5:
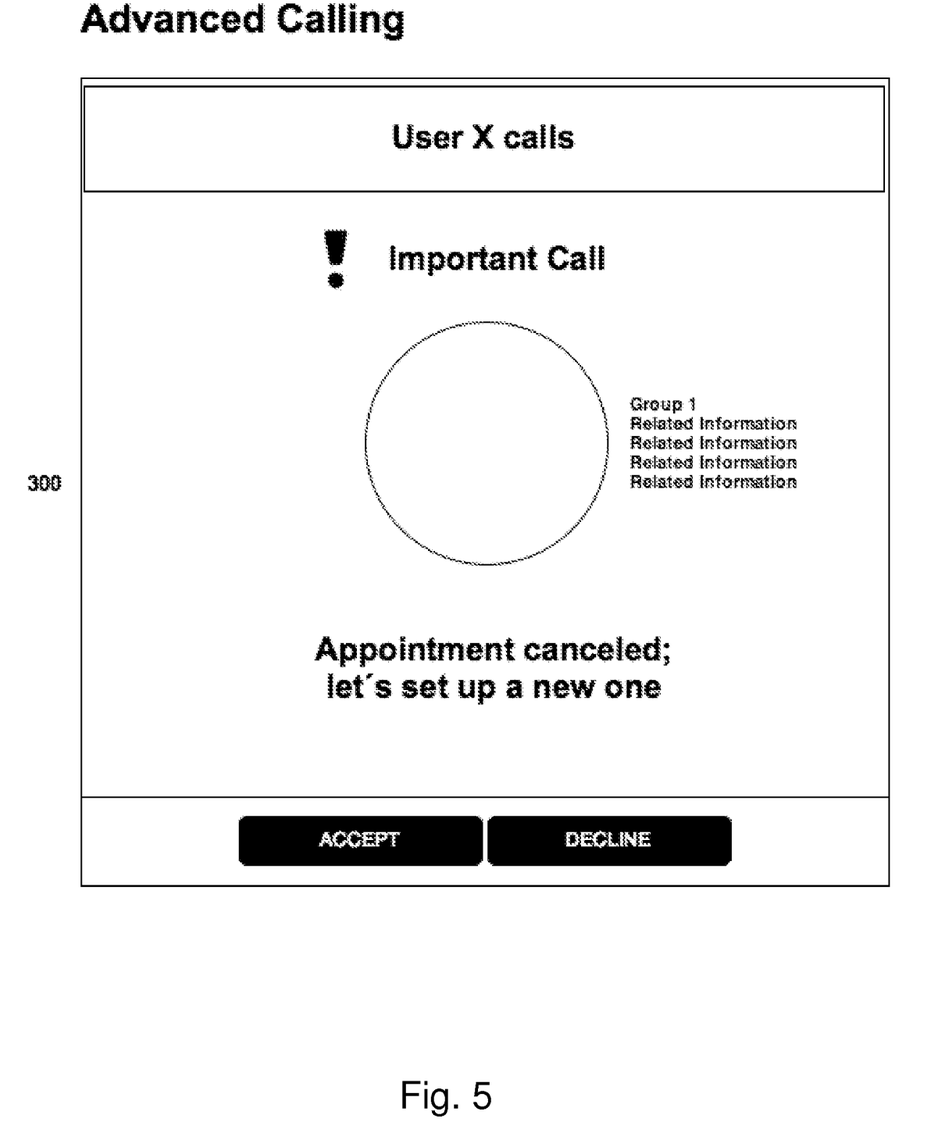
FIG. 5 is a screenshot of a user interface provided by a second communication unit presenting additional information to the second user.

FIG. 5 shows a screenshot 300 that is presented to a recipient of a call by the recipient's communication unit. In the top line of screenshot 300, it is indicated that the caller ("User X") has added an additional information to his call that labels the call to be an "important call." In screenshot 300, this additional piece of information is further presented by an exclamation mark ("!") as a symbol. It is further shown in screenshot 300 that User X belongs to Group 1. Alternatively or additionally, other information related to User X may be displayed.

In addition, the screenshot 300 shows the note "appointment canceled; let's set up a new one," which was previously added by the calling user X as an additional piece of information. The recipient may accept or decline the call using the buttons provided at the bottom of the screenshot 300.

As shown in FIG. 5, by receiving additional information, the recipient of a call immediately sees that User X has canceled the appointment and wants to set up a new one. The recipient may thus decide to answer the call immediately in order to set up a new appointment now. Alternatively, he may decline to answer the call or simply choose not to answer the call at all and may, for example, call back User X at a later time in order to set up a new appointment.

Figure 6:
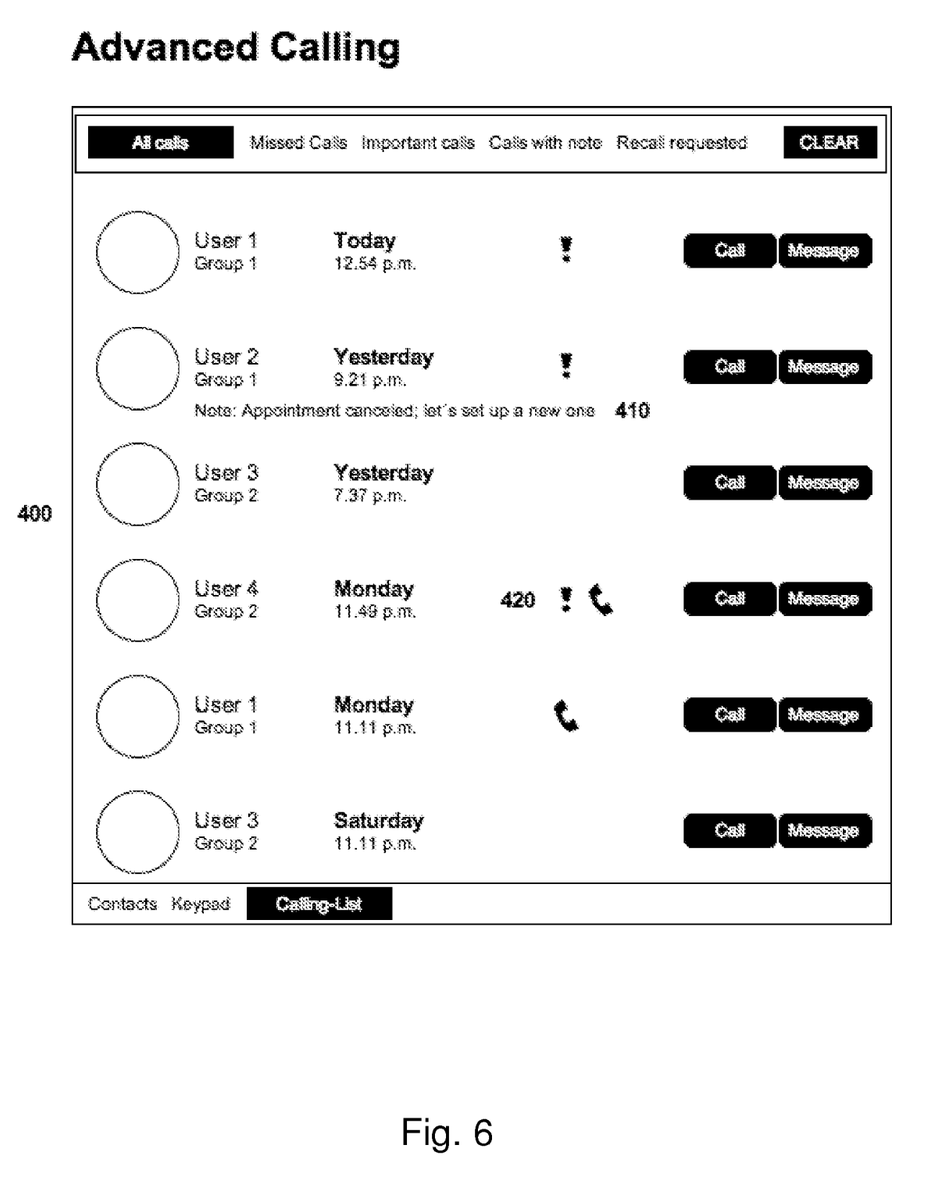
FIG. 6 is a screenshot of a user interface provided by the second communication unit informing the second user about missed calls.

FIG. 6 shows a screenshot 400 containing a calling list that displays all incoming and outgoing calls of a user. Using tabs labeled "all calls," "missed calls," "important calls," "calls with note" and "recall requested," the user may choose what kind of calls are to be listed in the calling list of screenshot 400. He may also click on the button labeled "clear" to clear the calling list. Using the tabs listed in the top line of screenshot 400, the user may thus adjust the calling list displayed in the screenshot. When "all calls" has been selected, then all calls are listed by user, including a group, if appropriate. Moreover, the day and time the call was made and the option of calling or messaging the caller is shown. Additional information such as a symbol 420 indicating a level of priority or a note 410 may also be displayed, in case it was previously provided by the calling user. Further visual indicators may be provided showing advanced calling options such as an indication that the call was labeled as important, that a call back is requested, an indication of an emergency call, that the call was made by a business associate, family member, etc.

In some examples, a user being the head of a household may have agreed with his family members that, in case a family emergency should occur, family members can contact the user by labeling their call as an emergency. As described above, the call can be color coded or labeled with a symbol or rated as very important. This allows the user to know instantly that he needs to make contact with the caller.

As a further example, when the first user needs to contact his traveling sales force in regard to a last minute change of a meeting time, the first user can make a group call labeled as "highly important" and comprising a short note informing the first user's staff of the change in time. Furthermore, the first user may receive an indication of whether the recipients of the call have accepted or declined the change in the meeting time, for example, by using the "accept" and "decline" buttons as shown in FIG. 5.

In a further example, a user may want to just accept important business related calls, while blocking all other call types. The user may then select this or other modes through the user's communication unit. However, the user may also want to be notified of certain other calls, such as important calls from a family member. The user may thus select such a feature through the user's communication unit. In that case, the communication unit will present, e.g., in the calling list, also calls from family members which were labeled as important by the caller.

It is to be understood that many modifications may be provided to the exemplifying embodiment of the method, the telecommunication system, or the communication unit without leaving the scope of the invention. Consequently, the invention may be practiced within the scope of the claims differently from the examples described. Also, the described features and characteristics may be of importance for the invention in any combination. For example, the additional information added to the call by the first user may comprise at least one of text, an icon, a color, a letter, and a number.

The embodiments of the invention in which an exclusive property or privilege is claimed are defined as follows:

1. A method, comprising:
   receiving, from a first communication unit, a request to establish a voice communication call between a first user of the first communication unit and a second user of a second communication unit;
   receiving, from said first communication unit, additional information with regard to said request; and
   presenting, by said second communication unit, an indication of said request to establish said voice communication call and said additional information to said second user,
   wherein said step of presenting further comprises presenting, by said second communication unit, supplementary information, wherein the supplementary information comprises a relationship between the first user and the second user, and wherein the supplementary information is stored in the second communication unit or at a server through which the request to establish the call is forwarded from the first communication unit to the second communication unit, and
   wherein said second communication unit only presents said indication of said request when said additional information and said supplementary information match set criteria.

2. The method of claim 1, further comprising:
   presenting, by said first communication unit, a plurality of annotations to said first user; and
   receiving, by said first communication unit, a selection of at least one of said plurality of annotations as said additional information from said first user.

3. The method of claim 1, wherein said additional information comprises information as to whether said first user requests a call back from said second user.

4. The method of claim 1, wherein said additional information comprises information referring to a priority level attributed to said voice communication call by said first user of said first communication unit.

5. The method of claim 1, wherein said additional information comprises information as to whether said voice communication call is an emergency call.

6. The method of claim 1, wherein said additional information comprises a note from said first user.

7. The method of claim 1, wherein said additional information comprises at least one of an icon, a color, and a number.

8. The method of claim 1, wherein said criteria are settable by said second user via said second communication unit for each of a number of users separately.

9. The method of claim 1, wherein said step of presenting further comprises presenting at least one of an identification of said first user and/or said first communication unit, a time when said request and/or said additional information was received at said second communication unit, a time when said request and/or said additional information was transmitted by said first communication unit, and a relationship between said second user and said first user.

10. A telecommunication system, comprising:
    first and second communication units,
    wherein said first communication unit is adapted to receive a request to establish a voice communication call with a second user of said second communication unit and additional information with regard to said voice communication call from a first user of said first communication unit; and
    a communication link coupled between said first and second communication units, wherein said first communication unit is adapted to transmit said request to establish a voice communication call and said additional information to said second communication unit via said communication link,
    wherein said second communication unit is adapted to present an indication of the first user's request to establish said voice communication call and said additional information to said second user, wherein said second communication unit comprises a display adapted to present said additional information to said second user;
    wherein the communication link is via a server, wherein the server adds supplementary information to the request, wherein the supplementary information added by the server is shown on the display provided on the second communication unit, and wherein the supplementary information comprises a relationship between the first user and the second user, and
    wherein said second communication unit only presents said indication of said request when said additional information and said supplementary information match set criteria.

11. The system of claim 10, said communication link comprising different carriers for transmitting said voice communication and said additional information.

12. The system of claim 10, said communication link comprising a same carrier for transmitting said voice communication and said additional information.

13. The system of claim 10, wherein said first communication unit comprises input means, said input means adapted to receive said additional information from said first user.

14. The system of claim 10, wherein said criteria are settable by said second user via said second communication unit for each of a number of users separately.

15. A communication unit comprising:
- a processor;
- a display device;
- a transceiver; and
- a non-transitory computer-readable storage medium having stored thereon instructions executable by said processor to cause said communication unit to:
  - receive a request to establish a voice communication call between said communication unit and a second communication unit, said request received by said transceiver from said second communication unit;
  - receive additional information with regard to said request, said additional information received by said transceiver from said second communication unit; and
  - present, by said display device, an indication of said request and said additional information, and supplementary information, wherein the supplementary information is stored in the communication unit and comprises a relationship between the first user and the second user,
  - wherein said second communication unit only presents said indication of said request when said additional information and said supplementary information match set criteria.

16. The communication unit of claim 15, wherein said communication unit is adapted to receive said request via a first carrier and to receive said additional information via a second carrier.

17. The method of claim 1, further comprising altering a ringing tone of the second communication unit based on the additional information received from the first communication unit.

* * * * *